July 14, 1953 — V. M. LONG — 2,645,523
SUPPORT STRUCTURE FOR BOOM TYPE CROP SPRAYERS
Filed Sept. 7, 1951 — 2 Sheets-Sheet 1
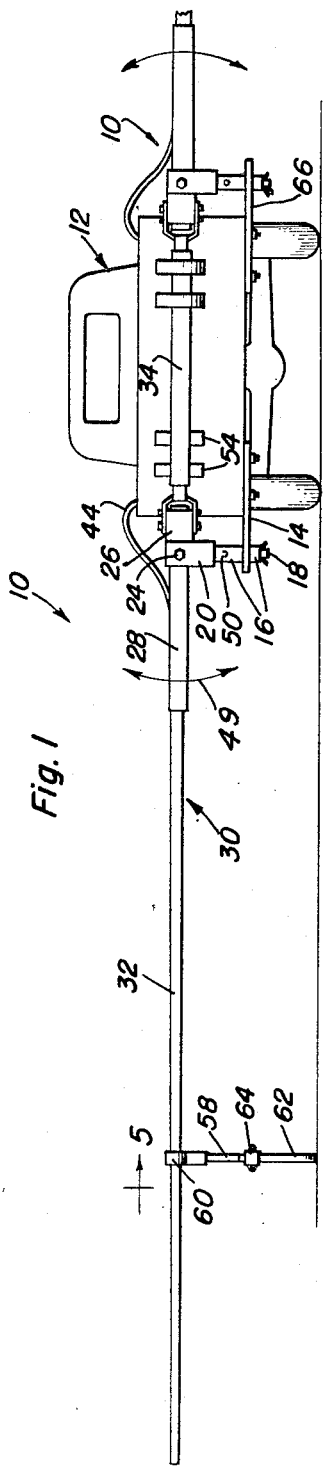
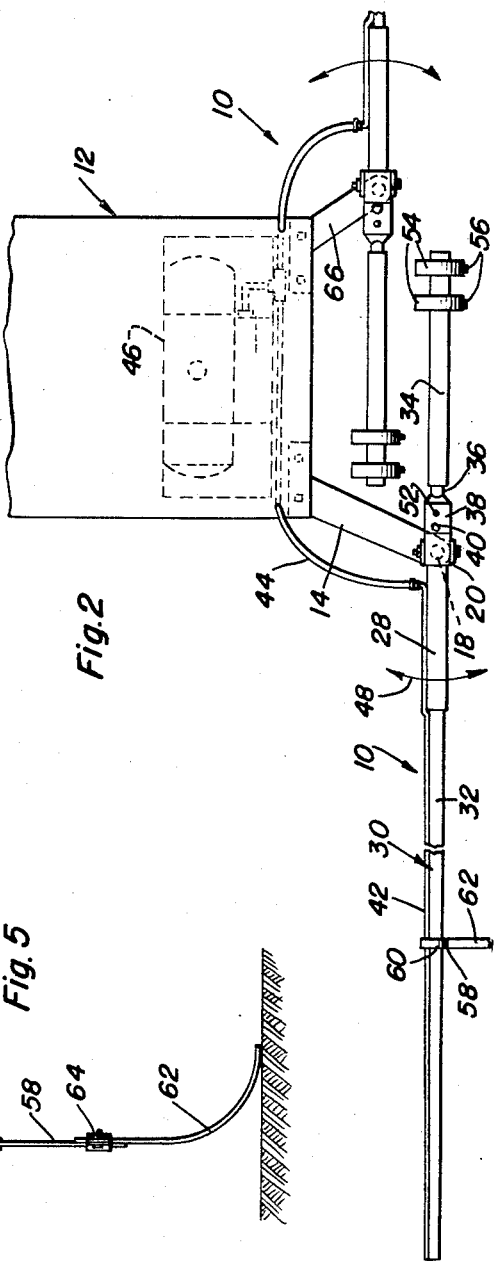
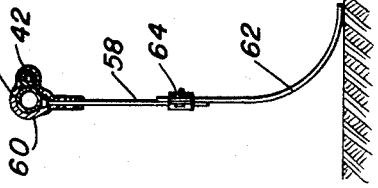
Vinje M. Long
INVENTOR.

July 14, 1953 V. M. LONG 2,645,523
SUPPORT STRUCTURE FOR BOOM TYPE CROP SPRAYERS
Filed Sept. 7, 1951 2 Sheets-Sheet 2
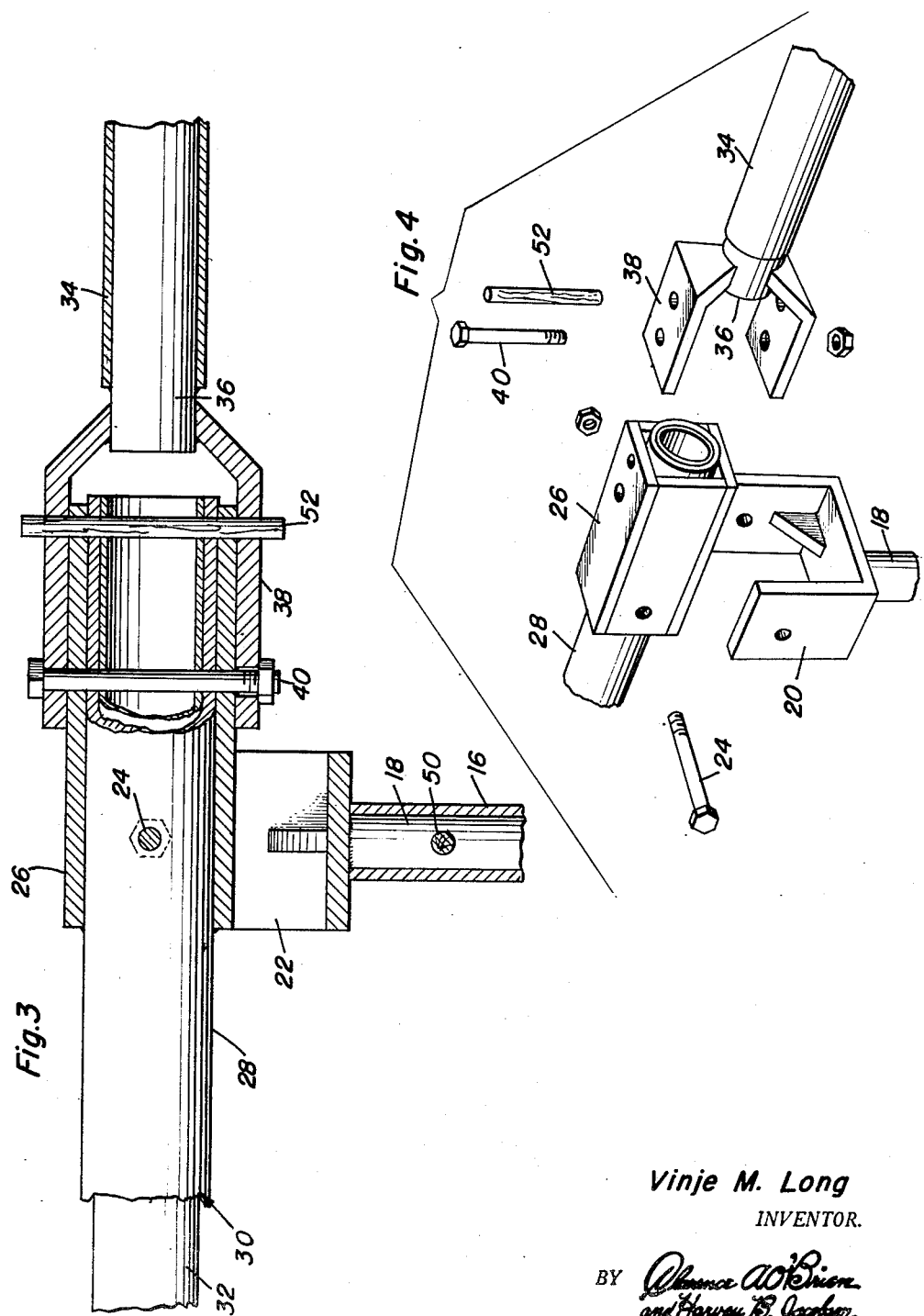
Vinje M. Long
INVENTOR.

Patented July 14, 1953

2,645,523

UNITED STATES PATENT OFFICE 2,645,523

SUPPORT STRUCTURE FOR BOOM TYPE CROP SPRAYERS

Vinje M. Long, Lewistown, Mont.

Application September 7, 1951, Serial No. 245,504

7 Claims. (Cl. 299—30)

This invention relates to new and useful improvements and structural refinements in crop sprayers, and more particularly, crop sprayers of the type employing a vehicle mounted boom, and the principal object of the invention is to provide an improved supporting structure for the spraying conduit, this structure being adapted for pivotal movement in vertical as well as horizontal planes, so as to enable the vehicle with the sprayer equipment thereon to pass through narrow gateways, and so as to protect the spraying equipment from damage when obstructions are encountered.

Some of the advantages of the invention reside in its simplicity of construction, in its efficient and dependable operation, and in its adaptability for use with spraying equipment of different types.

With the above more important objects and features in view and such other objects and features as may become apparent as this specification proceeds, the invention consists essentially of the arrangement and construction of parts as illustrated in the accompanying drawings, in which:

Figure 1 is a rear elevational view of a vehicle having the invention mounted thereon;

Figure 2 is a top plan view of the subject shown in Figure 1;

Figure 3 is a fragmentary sectional detail of the various pivotal connections used in the invention;

Figure 4 is a group perspective view of the components shown in Figure 3; and

Figure 5 is a fragmentary sectional detail, taken substantially in the plane of the line 5—5 in Figure 1.

Like characters of reference are employed to designate like parts in the specification and throughout the several views.

Referring now to the accompanying drawings in detail, the invention comprises supporting structure for crop spraying apparatus, the structure, as a unit, being designated generally by the reference character 10 and being particularly adapted for installation or attachment at the rear end of a vehicle 12. The supporting structure is referably used in pairs having booms projecting laterally to opposite sides of the vehicle, but since the arrangement of the structure in each unit is the same, it is believed that a description of one unit will suffice for both.

Accordingly, each unit comprises a supporting bracket 14 which is rigidly secured to and projects rearwardly and laterally from the vehicle 12, and the outer end of the bracket is provided with vertical bearing members 16 to rotatably accommodate a vertical pivot pin 18 which is secured to and depends from a fork 20.

A suitable cotter pin 22 extends through the pivot pin 18 below the bearing members 16 to sustain the pivot in position, and the fork 20 carries a horizontal pivot pin 24 extending through a swingable box 26.

The box 26 has rigidly secured therein a tubular sleeve 28 which constitutes a component of a boom assembly 30, the latter also including a relatively long arm 32 which is rigidly secured in the sleeve 28 and a relatively short arm 34 which will be presently described.

It is to be noted that the long arm 32 and the the short arm 34 of the boom assembly are disposed at the respective outer and inner sides of the pivot pin 24, the short arm 34 being connected to the rest of the boom by means of an adapter 36 which is rigidly secured in the arm 34 and carries a fork 38, connected by a vertical pivot pin 40 to the aforementioned box 26.

A conventional conduit 42 is suitably affixed to the long arm 32 of the boom and is connected by a flexible hose 44 to a reservoir or pump 46 carried by the vehicle 12, this particular arrangement constituting no part of the present invention.

It will be apparent from the foregoing that by virtue of the pivot pin 18 which is rotatably journaled in the bearing member 16, the entire boom 30 may be swung in a horizontal plane as indicated at 48 in Figure 2, such as for example, while the machine is passing through a narrow gateway, in which instance the boom may be swung forwardly to be disposed longitudinally at one side of the vehicle. Moreover, by virtue of the pivot pin 24, the boom assembly 30 may be swung in a vertical plane as illustrated at 49 in Figure 1. In addition, as facilitated by the pivot pin 40, the long, outer arm 32 of the boom may be swung rearwardly until the short arm 34 contacts the rear end of the vehicle 12, after which the long arm 32 may continue to swing rearwardly without damaging the short arm or the vehicle itself.

However, means are provided for releasably locking the swinging movement of the boom about the pivots 18, 40, these consisting of a rupturable locking pin 50 which extends transversely through the pivot pin 18 and the adjacent bearing member 16, and sustains the boom in a position where it is substantially perpendicular to the longitudinal axis of the vehicle. However, if some obstruction is encountered, the pin is automatically sheared, thus permitting the boom to swing about the pivot 18. Similarly, a rupturable locking pin 52 extends through the fork 38, the box 26 and the sleeve 28, so that pivotal action about the pin 40 is possible only when the outer arm 32 of the boom is forced rearwardly and the inner arm 34 comes in contact with the rear end of the vehicle, at which point the pin 52 becomes sheared.

One or more counterweights 54, provided with suitable setscrews 56, are adjustably positioned on the short arm 34 so as to counterbalance the long arm 32 about the pivot 24, but these counterweights are so adjusted that the relatively long arm 32 has a slight tendency to swing downwardly. To offset this tendency, a leg 58 is mounted intermediate the ends of the long arm by means of a clamp bracket 60, the leg 58 including an upper portion and a resilient, arcuate strap which constitutes a ground engaging foot 62 and is adjustably connected to the upper portion of the leg by a clamp 64. The foot 62 is so adjusted by means of the clamp 64 relative to the upper portion of the leg 58 that the foot 62 lightly engages the ground, so as to sustain the boom at a predetermined level, regardless of any irregularities such as the ground surface may present. However, the leg may rotate in the bracket 60, with changes in the direction of travel.

As has been already stated, the boom structure at the relatively opposite side of the vehicle is substantially the same as the one already described, but it is to be noted that the support bracket 66 is relatively shorter than the bracket 14, so that one boom structure is disposed somewhat in advance or ahead of the other to facilitate free swinging movement of both structures in their respective vertical planes.

It is to be noted that the vertical swinging movement of the boom assembly is an important feature of this invention, since the inertial force of the counterbalance creates an oscillation to compensate for the jolting effect of the vehicle as it rolls over uneven ground, with the result that there is little or no vertical whip or jerk stress on outer arm 32, and provision is thus made for a smooth floating stability of the entire boom. This, in turn, makes it possible to employ a boom of unusual length with a corresponding increase in spraying capacity.

It is believed that the advantages and use of the invention will be clearly understood from the foregoing disclosure and accordingly, further description thereof at his point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described my invention, what is claimed as new is:

1. Support structure for boom type crop sprayers, said structure comprising a vertical pivot unit adapted for attachment to a vehicle, a horizontal pivot unit carried by said vertical pivot unit, a boom mounted intermediate the ends thereof on the horizontal pivot unit and including a relatively long outer arm and a relatively short inner arm, an adjustable counterweight on said inner arm, and a ground engaging leg provided on the outer arm of said boom.

2. The device as defined in claim 1 wherein the inner arm of said boom comprises a pair of pivotally connected sections, and rupturable means for sustaining said sections in longitudinal alignment.

3. In a support structure for boom type crop sprayers, the combination of a horizontal pivot unit, a boom mounted intermediate the ends thereof on said pivot unit and affording a relatively long arm and a relatively short arm, a sprayer conduit attached longitudinally to said long arm, an adjustable counterweight on said short arm, and an adjustable leg provided on and extending downwardly from the long arm, said leg including a ground engaging foot.

4. The device as defined in claim 3 together with means for extending and shortening said leg.

5. The device as defined in claim 3 together with means for attaching said leg to said long arm to permit rotation of the leg about a vertical axis.

6. The device as defined in claim 3 wherein said foot comprises an arcuate resilient strap.

7. Support structure for boom type crop sprayers, said structure comprising a vertical bearing member adapted to be secured to a vehicle, a vertical pivot pin rotatably journalled in said bearing member, a fork carried by said vertical pivot pin, a horizontal pivot pin provided in said fork, a boom mounted intermediate its ends on said horizontal pivot pin and including a relatively long outer arm and a relatively short inner arm, said inner arm comprising a pair of sections, a vertical fulcrum pin connecting said sections together, rupturable means for locking said sections against movement about the axis of said fulcrum pin, and rupturable means for locking said pivot pin against rotation in said bearing member.

VINJE M. LONG.

References Cited in the file of this patent
UNITED STATES PATENTS

| Number | Name | Date |
|---|---|---|
| 1,526,642 | Nissley | Feb. 17, 1925 |
| 2,301,213 | Kang | Nov. 10, 1942 |
| 2,518,952 | Sohmer | Aug. 15, 1950 |
| 2,575,521 | Ireland | Nov. 20, 1951 |